L. W. NELSON.
POWER TRANSMISSION AND CONTROL.
APPLICATION FILED DEC. 6, 1909.

1,196,713.

Patented Aug. 29, 1916.
2 SHEETS—SHEET 2.

WITNESSES:

INVENTOR
Lewis W. Nelson
BY
Augustus B. Stoughton
ATTORNEY.

UNITED STATES PATENT OFFICE.

LEWIS W. NELSON, OF PHILADELPHIA, PENNSYLVANIA, ASSIGNOR, BY MESNE ASSIGNMENTS, TO U. S. LIGHT & HEAT CORPORATION, OF NIAGARA FALLS, NEW YORK, A CORPORATION OF NEW YORK.

POWER TRANSMISSION AND CONTROL.

1,196,713.  Specification of Letters Patent.  Patented Aug. 29, 1916.

Application filed December 6, 1909. Serial No. 531,636.

*To all whom it may concern:*

Be it known that I, LEWIS W. NELSON, a citizen of the United States, and a resident of Philadelphia, in the county of Philadelphia and State of Pennsylvania, have invented certain new and useful Improvements in Power Transmission and Control, of which the following is a specification.

Objects of the present invention are to provide a compact, light and efficient dynamo-electric machine capable of transmitting mechanical power and of changing speed ratios and also capable of receiving electrical energy and delivering mechanical energy in various speed ratios; to provide for transmitting the power of a prime mover to a driven part at various speed ratios without affecting the speed and output of the prime mover, and to provide a simple, reliable and compact dynamo-electric apparatus capable of a variety of uses.

Other objects of the invention will appear from the following description taken in connection with the accompanying drawings in which I have illustrated embodiments, but not the only embodiments of my invention.

Figure 1:
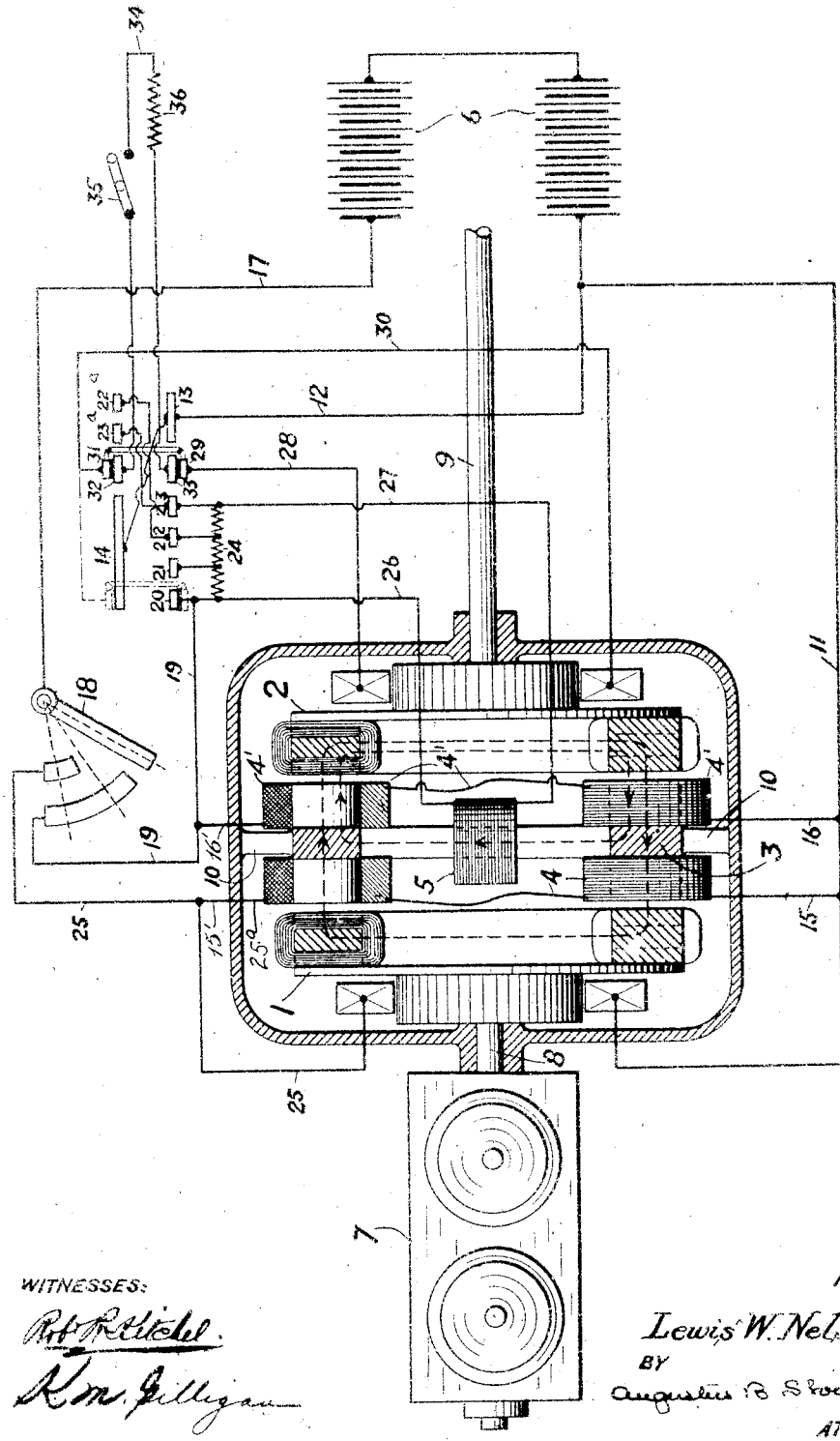
Figure 2:
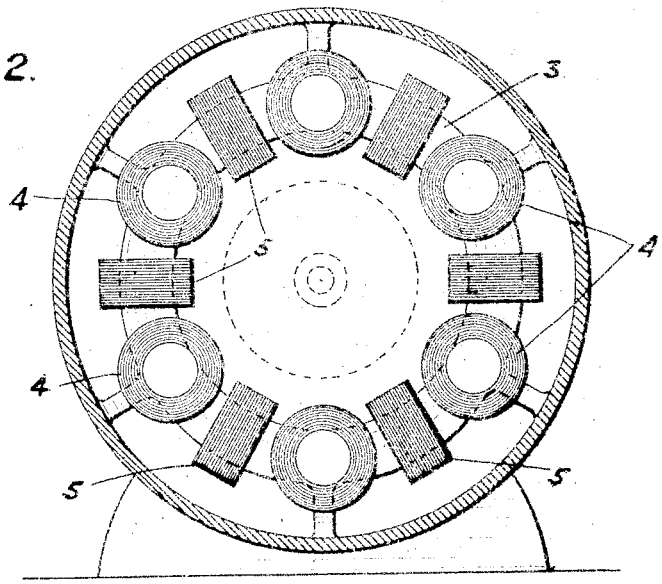
Figure 3:
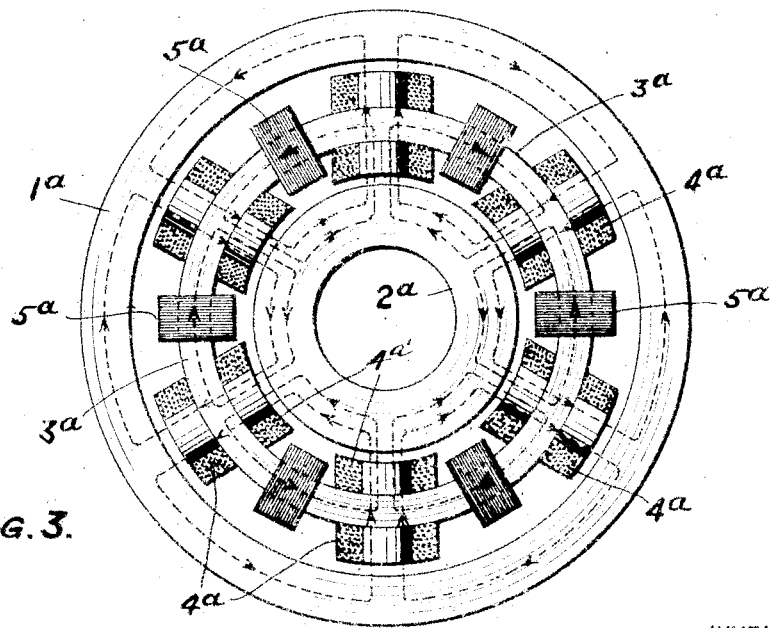

Figure 1, is a diagrammatic view illustrating apparatus embodying features of the invention in application to a power plant such as can be used on a vehicle. Fig. 2, is a view taken on a line lying to the right of the right hand field coil 1 of Fig. 1, showing a few more windings than are illustrated in that figure, and Fig. 3, is a diagrammatic view illustrating an embodiment of the invention, in which the parts are arranged concentrically.

In the drawings 1 and 2 are mechanically independent armatures.

3. is a field structure common to both armatures and provided with windings 4 4' for creating a flux through both armatures. The general path of this flux is indicated by the outer dotted line in Fig. 1.

5, are auxiliary windings for varying the flux in either armature 1 or 2. As shown in the drawing it is assumed to vary the flux in the armature 2 and it does this by creating a flux, the path of which is indicated in Fig. 1 by the inner dotted line; so that as shown in Fig. 1, the flux through armature 2 would be greater than the flux through armature 1. The relative arrangement of the field and armatures is not essential. As shown in Fig. 1 they are arranged as a "transversal electro-magnetic fly-wheel type". Without intending to limit the arrangement there is shown in Fig. 3 an external and internal armature of the "Gramme ring type." It is unnecessary to illustrate any more of the well known types, because they are fully understood by those skilled in the art.

In Fig. 3, $3^a$ is the field, $1^a$ and $2^a$ are the armatures, $4^a$ $4^{a'}$ are the windings for creating a flux through both armatures and $5^a$ are the auxiliary windings for varying the flux in one of said armatures. In Fig. 3, the dotted lines extending through both armatures indicate the path of the flux created by the windings $4^a$, $4^{a'}$ and the dotted lines extending through the inner armature and field structure indicate the flux produced by the auxiliary windings $5^a$. As shown in Fig. 3, the armature $2^a$ is shown as receiving the greater flux. However, in this case, as in Fig. 1, the outer armature may be arranged to receive the greater flux. By applying current to the armatures and energizing the field windings it is possible to drive either one of the armatures or to drive them both, or to drive them both at different speeds. By applying mechanical energy to either one of the armatures and energizing the fields and electrically connecting the other armature to the first mentioned armature, it is possible to transmit mechanical power at various speed ratios.

For the sake of a further explanation the invention will be described in connection with the power plant shown in Fig. 1, which involves a storage battery 6 and a prime mover 7; the storage battery serving to take fluctuations of load above and below the average load of the prime mover. The armature 1 is mechanically connected with the engine shaft 8 and the armature 2 is connected with the driving shaft 9, which in turn may be connected to a vehicle drive, not shown. The field structure 3 is shown as fixed and supported, for example by brackets 10. There are provisions for connecting the armature 1, the armature 2 and the battery 6 in parallel. A conductor 11 connects the battery with the brush of the armature 1. A conductor 12 connects the battery with the controller contacts 13 and 14. The field windings 4 are connected across the armature 1 by conductors 15 and 15'. A conductor 17 connects the battery with a two-point switch 18 and this switch in its first position connects the conductor 17 with the conductor 19 which connects with the controller contact 20, which in turn is connected with the contacts 21, 22 and 23, through resistance 24, as shown. In its second position the switch 18 makes not only the connections described, but also connects the conductor 17 with the conductor 25 which connects with the brush of the armature 1. The field windings 4' are connected between conductors 19 and 11 by conductors 16 and 16'. The auxiliary winding 5 is connected by means of the conductors 26 and 27 across the resistance 24. The brush of the armature 2 is connected by a conductor 28 with the movable arm 29 of the controller and the other brush of the armature 2 connects by a conductor 30 with the contact 31 of the movable arm of the controller. The contacts 32 and 33 of the controller are connected by a conductor 34 through a switch 35 and resistance 36. In describing the connections to the field it must be borne in mind that they can, of course, be excited from appropriate sources other than those mentioned. As shown in Fig. 1, the parts are in what may be called the "off position" and in the case of a vehicle it may be assumed to be at rest; that is, the engine is stopped.

In operating if it is desired to start the vehicle without starting the engine 7, the armature 2, may be utilized. The switch 18 is moved to its first dotted line position, thus completing a circuit from the battery through the field windings 4' by means of conductor 17, switch 18, conductors 19 and 16', field windings 4' and conductors 16 and 11 to the battery. This places the vehicle in readiness to be started when the controller contacts 29 and 31 are simultaneously moved to the first forward position in which contact 29 engages contact 23, and contact 31 engages contact 14. This energizes the armature 2 and the auxiliary field coils 5 by a circuit from the battery through conductor 17, switch 18, conductors 19 and 26, field coils 5, conductor 27, contact 23, controller contact 29, conductor 28, armature 2, conductor 30, controller contact 31, contacts 14 and 13 and conductor 12 to the battery. The auxiliary coil 5 is thus connected in series with the armature 2 and is also shunted by the resistance 24. This produces a strong field and also allows a heavy armature current to flow, since some current will flow by way of resistance 24 from conductor 19 to contact 23 and the armature. A high torque will thereby be produced to start the vehicle. By moving the controller arm successively over contacts 22, 21 and 20, steps of resistance 24 are cut out, thus permitting more current to flow to the armature and at the same time weakening the field 5 until in the final position of the controller the field 5 is practically inoperative and the entire field excitation is furnished by coils 4'. This is the position for obtaining the maximum speed from armature 2. When it is desired to bring the engine into operation the switch 18 is moved into its second dotted line position. This completes a circuit from the battery through conductor 17, switch 18, conductor 25, armature 1 and conductor 11 to the battery. At the same time field windings 4 are energized by conductors 15' and 15. The armature 1 will immediately operate as a motor to start the engine. As soon as the engine speeds up under its own power the armature 1 will begin to generate and will deliver current to the battery and to the armature 2, provided the controller is in one of its active positions. If it is desired to operate the armature 2 in the reverse direction, as in backing the vehicle, the controller may be moved in the opposite direction to energize the right hand contacts 23 and 22, and the contact 13. This will complete the armature circuit in the opposite direction. Only two reverse contacts are illustrated although more may be added if desired. It will also be noted that when the contacts 29 and 31 are in the neutral position on contacts 33 and 32, if the armature 2 is revolving, and the shunt coils 4' are excited, the armature 2 may be utilized as a brake by closing the switch 35 and allowing the armature 2 to expend its generator energy through circuit 34, including resistance 36.

What I claim is:

1. In combination, an internal combustion engine, a shunt field dynamo electric machine mechanically connected to said engine to drive the same or be driven thereby, a driven shaft, a second shunt field dynamo electric machine mechanically connected to said shaft to drive the same, a source of electrical energy, and a switch having a plurality of operating positions, said switch in one position causing energization of the shunt field of said second machine from said source and in a second operative position maintaining said first connections and completing a circuit from said source to energize the field and armature of said first machine, whereby said first machine may operate as a motor to start the engine and thereafter as a generator driven by said engine to supply current to the field of said second machine.

2. In combination, an internal combustion engine, a shunt field dynamo electric machine mechanically connected to said engine to drive the same or be driven thereby, a driven shaft, a second shunt field dynamo electric machine mechanically connected to said shaft to drive the same, a source of electrical energy, a switch having a plurality of operating positions, said switch in one position causing energization of the shunt field of said second machine from said source and in a second operative position maintaining said first connections and completing a circuit from said source to energize the field and armature of said first machine, whereby said first machine may operate as a motor to start the engine and thereafter as a generator driven by said engine to supply current to the field of said second machine, and a separate controller for controlling the armature current of said second machine.

3. In combination, a dynamo electric machine having an armature and a field winding, a storage battery, a switch for connecting said field winding to be energized from said battery, a controller for connecting said armature to be energized from said battery whereby said machine may be operated as a motor, a second dynamo electric machine, means for driving said second machine as a generator, and connections whereby said switch may maintain said first mentioned connections and simultaneously complete the field and armature connections of said second machine whereby said second machine may operate said first machine as a motor and also charge said storage battery.

4. In combination, an internal combustion engine, a dynamo electric machine mechanically connected thereto, a second dynamo electric machine, a shaft to be driven, mechanically connected to said second dynamo electric machine, a storage battery, a switch for energizing the field of said second machine from said battery, and a controller for energizing the armature of said second machine from said battery, said controller controlling means for simultaneously weakening the field excitation and strengthening the armature current of said machine, said switch in a second operative position serving to maintain connections for said second machine and to complete the field and armature circuits for said first dynamo electric machine.

5. In combination, an internal combustion engine, a shunt wound dynamo electric machine mechanically connected to the engine shaft, a driven shaft, a second dynamo electric machine provided with shunt and series windings mechanically connected to said shaft to drive the same, a storage battery, a switch having a plurality of operative positions, said switch in its first operative position serving to energize the shunt field of said second dynamo electric machine from the storage battery, a controller having a plurality of operative positions, said controller in its first operative position serving to connect the armature of said second dynamo electric machine to the storage battery, through a resistance, and to connect the series field thereof in shunt to said resistance, said controller serving in its successive positions to cut out sections of said resistance to simultaneously weaken said series field and increase the current in said armature, and said switch serving in its second operative position to connect said first dynamo electric machine in parallel with said second machine and the storage battery whereby said first machine may start the engine and thereafter operate to charge the battery and to supply current to operate said second machine.

6. In combination, a dynamo electric machine having an armature and a field winding, a storage battery, a switch for connecting said field winding to be energized by said battery, means for connecting said armature to be energized by said battery whereby said machine will operate as a motor, a mechanical load to be driven thereby, a second dynamo electric machine, means for driving said second machine as a generator, and connections whereby said switch may maintain said first mentioned connections and simultaneously complete the field and armature circuits to said second machine, whereby said mechanical load may be started by said motor operated from said battery and thereafter without interrupting said connections, said load may be driven from said motor operated from said generator.

7. In combination, a prime mover requiring an initial starting impulse, a dynamo electric machine connected thereto to furnish said starting impulse or to be driven as a generator thereby, a driven shaft, a motor for driving said shaft, a source of electrical energy, and a switch for connecting said motor to said source to be operated thereby, said switch in a second position serving to maintain said connections and simultaneously connect said generator to furnish current to said motor whereby said driven shaft may be started by said motor operated by said electrical source and thereafter operated by said generator without interruption.

8. In combination, a prime mover requiring an initial starting impulse, a dynamo electric machine connected thereto to furnish said starting impulse or to be driven as a generator thereby, a driven shaft, a motor for driving said shaft, a source of electrical energy, a switch for connecting said motor to said source to be operated thereby, said switch in a second position serving to maintain said connections and simultaneously connect said generator to furnish current to said motor whereby said driven shaft may be started by said motor operated by said electrical source and thereafter operated by said generator without interruption, and a controller for varying the operation of said motor.

In testimony whereof I have hereunto signed my name.

LEWIS W. NELSON.

In the presence of—
CLIFFORD K. CASSELL,
K. M. GILLEGAN.